F. H. GUYVER.
OIL INDICATOR FOR MOTOR VEHICLES.
APPLICATION FILED JULY 30, 1920.

1,385,128.

Patented July 19, 1921.

Inventor-
Frank Henry Guyver
By
B. Singer, Atty

UNITED STATES PATENT OFFICE.

FRANK HENRY GUYVER, OF STRATFORD-ON-AVON, ENGLAND.

OIL-INDICATOR FOR MOTOR-VEHICLES.

1,385,128.   Specification of Letters Patent.   Patented July 19, 1921.

Application filed July 30, 1920. Serial No. 400,048.

*To all whom it may concern:*

Be it known that I, FRANK HENRY GUYVER, subject of Great Britain, residing at 43 Guild street, Stratford-on-Avon, in the county of Warwick, England, have invented certain new and useful Improvements Relating to Oil-Indicators for Motor-Vehicles, of which the following is a specification.

This invention has reference to the engine lubrication system of motor vehicles, including motor boats and aircraft, and has for its object to enable the driver or navigator at all times to ascertain at a glance whether or not the said system is in proper working order.

The invention involves the use of a self-luminous device arranged for exposure directly or indirectly through the agency of the oil pressure and conveniently placed for observation by the driver.

The said device may consist of a slide coated with a phosphorescent or other self-luminous substance and arranged to move under the influence of the oil pressure within a glazed frame or fitting secured to or let in the front of the dashboard in view of the driver.

The action of the device is such that only when the oil is circulating freely is the self-luminous slide or the like exposed to view: at all other times it is covered by a fixed shutter or its equivalent.

Conversely of course, the self-luminous part may be fixed and the shutter adapted for operation by the oil pressure so as to expose the former to view to indicate that the lubrication system is in order.

In either case the device may replace the present plunger or dial type of oil indicator or it may be incorporated therewith or operated directly or indirectly therefrom in any suitable manner.

In order that the invention may be clearly understood reference is made in further describing the same to the accompanying drawings which show, by way of example only, one way in which the invention may be carried into practical effect.

Throughout the drawing like parts are designated by similar reference characters, Fig. 1 being drawn to a smaller scale than the other figures.

Figure 1:
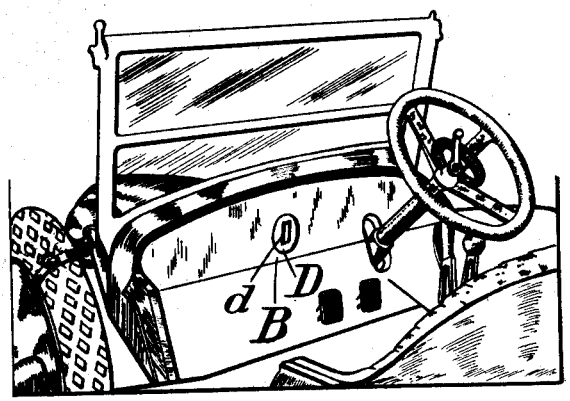
Figure 1 is a general view of the dashboard of a motor vehicle illustrating the manner in which it is proposed to fit the improved oil indicator.
Figure 2:
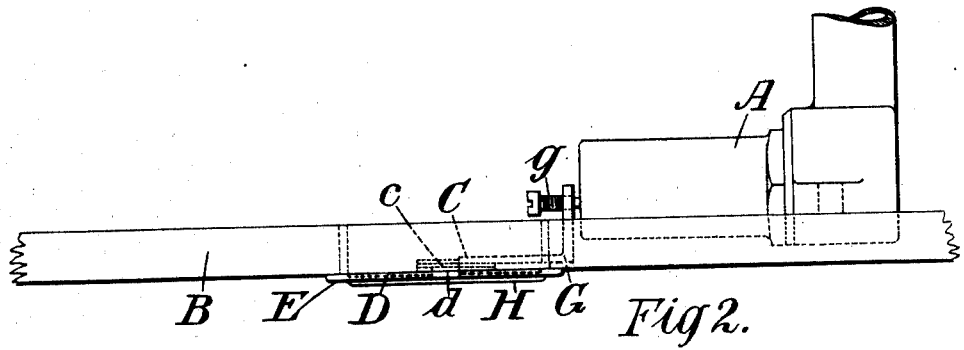
Fig. 2 is a plan view of the complete device.

Referring to the specific example shown in the drawings, A represents an ordinary pressure gage or indicator of the well known plunger type which for the purposes of the present invention is arranged at the back of the dashboard B with the axis of the plunger $a$ parallel therewith.

Figures 3, 4:
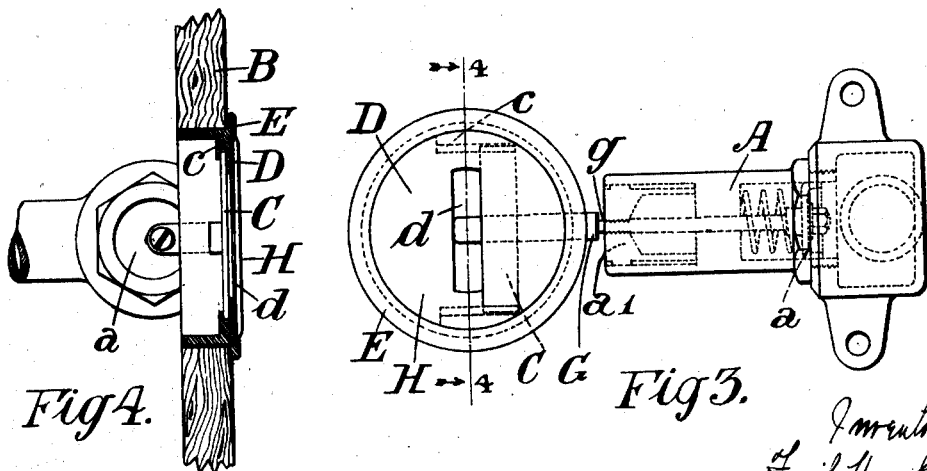
Fig. 3 is a front view of the same.
Fig. 4 represents a transverse sectional view on the line 4—4 of Fig. 3.

C represents a slide which is free to move across the back of a fixed slotted disk D between guides $c$ arranged within a hollow casing E let into the dashboard as seen in Fig. 4. The said slide is attached by means of an elbow piece or bracket G to the outer end $a'$ of the plunger $a$ so that as the plunger is moved outward by the oil pressure a corresponding movement is imparted to the slide.

The front face of the said slide has one vertical portion colored black or red and the other part coated or treated with some light colored phosphorescent or other self-luminous substance.

The disk D is preferably colored black and protected by a glass cover H let into the casing E flush or nearly so with the dashboard.

Instead of providing the slide with a non-luminous portion it may be wholly self-luminous and adjusted so that when withdrawn behind the disk D as the result of the absence of the oil pressure it exposes to view through the slot $d$ in the latter a red or other suitably colored back ground.

The slide is adjusted or fitted with respect to the slotted disk D so that normally, that is to say, when the engine is not running and the plunger is consequently in its innermost position, the light colored self-luminous portion of the slide is behind and covered by the disk D, the black or red portion only showing through the slot in the latter.

When however the engine is running and the oil circulation system is in proper working order the plunger is as usual moved outward by the oil pressure with the result that the slide is correspondingly moved across the back of the slotted disk D and the light colored self-luminous portion is exposed to view through the slot $d$ in said disk.

By this means the driver can tell at a glance both at night time and in daylight whether or not the oil circulation system is working properly.

A minor adjustment of the slide relatively to the plunger and disk D can be made by means of the small screw $g$ which secures the elbow piece or bracket G to the plunger.

As already stated the above described construction is by way of example only and it is not intended to confine the invention to this particular way of carrying it into practice.

For instance instead of the slide being rigidly secured to the plunger it may be operated therefrom by means of a lever. Or again, the slide may be stationary and the slotted disk be arranged for operation by the oil pressure either by means of a plunger or otherwise.

The use of the present conventional plunger type indicator is not essential to the present invention but is merely shown as a convenient way of operating the slide or the slotted disk as the case may be.

According to a further alternative the slide or disk instead of having a rectilinear movement may be formed and arranged to have a circular motion, the effect in each case being the same.

For instance a rotatable disk or cylinder having one part of its surface coated with some light colored phosphorescent or other self-luminous substance may be arranged for operation by the oil pressure to expose the self-luminous part through a slot or opening when the oil circulation system is in proper working order.

Claim:

An oil indicator comprising a casing having internal guides, an opaque member closing said casing and having an opening therein, a self-luminous member having linear movement within said guides behind and relatively to said opaque member, and a spring plunger operatively connected with said self-luminous member and in constant subjection to the influence of the oil pressure, substantially as set forth.

In testimony whereof I hereto affix my signature in presence of two witnesses.

FRANK HENRY GUYVER.

Witnesses:
  DAISY H. CURRAY,
  ERNEST P. MORLEY.